United States Patent
Feltham et al.

(10) Patent No.: US 9,940,314 B2
(45) Date of Patent: Apr. 10, 2018

(54) SYNCHRONISING SCREENSHOTS IN DOCUMENTATION WITH PRODUCT FUNCTIONALITY

(71) Applicant: International Business Machines Corporation, Armonk, NY (US)

(72) Inventors: Andrew Feltham, Hursley (GB); Dominic Peter Harries, Winchester (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 14/050,865

(22) Filed: Oct. 10, 2013

(65) Prior Publication Data

US 2014/0181626 A1    Jun. 26, 2014

(30) Foreign Application Priority Data

Dec. 20, 2012    (GB) .................................. 1223026.4

(51) Int. Cl.

| | |
|---|---|
| A63F 13/00 | (2014.01) |
| G06F 17/22 | (2006.01) |
| G06F 17/24 | (2006.01) |
| G06F 17/27 | (2006.01) |
| G06F 17/21 | (2006.01) |
| G06F 9/44 | (2018.01) |

(52) U.S. Cl.
CPC ............ *G06F 17/2288* (2013.01); *G06F 8/73* (2013.01); *G06F 17/211* (2013.01); *G06F 17/2229* (2013.01); *G06F 17/243* (2013.01); *G06F 17/2725* (2013.01)

(58) Field of Classification Search
CPC .......... G06F 17/30056; G06F 17/2288; G06F 17/2229; G06F 17/243; G06F 17/2725; G06F 17/211; G06F 8/73
USPC ........................................................ 715/203
See application file for complete search history.

(56) References Cited

U.S. PATENT DOCUMENTS

| | | | |
|---|---|---|---|
| 6,404,441 B1 | 6/2002 | Chailleux | |
| 7,490,298 B2 | 2/2009 | Bauman et al. | |
| 8,425,325 B2 * | 4/2013 | Hope ................ | G06F 17/30056 463/29 |
| 2008/0282160 A1 | 11/2008 | Tonnison et al. | |
| 2009/0083710 A1 | 3/2009 | Best et al. | |
| 2011/0026828 A1 | 2/2011 | Balasubramanian | |
| 2011/0202847 A1 | 8/2011 | Dimitrov | |

(Continued)

*Primary Examiner* — Scott Baderman
*Assistant Examiner* — Hassan Mrabi
(74) *Attorney, Agent, or Firm* — DeLizio Law, PLLC

(57) ABSTRACT

Systems and computer program product synchronize screenshots in documentation with product functionality. Documentation source relating to a product includes placeholders where screenshots of user interface views of the product are to be located. A placeholder includes a description or pointer to a description of how to generate the user interface view of the product associated with the screenshot. A new version of the documentation may be generated. The documentation source including placeholders is read. Placeholders in the documentation are used to generate a user interface view. The user interface view is captured as a screenshot. The screenshot is inserted in the new version of the documentation at the location of the placeholder used to generate the screenshot.

19 Claims, 5 Drawing Sheets

(56) References Cited

U.S. PATENT DOCUMENTS

| | | | |
|---|---|---|---|
| 2011/0209047 A1* | 8/2011 | Olsen | G06F 9/4448 |
| | | | 715/234 |
| 2012/0144286 A1 | 6/2012 | Bank et al. | |
| 2012/0154608 A1 | 6/2012 | Ko | |
| 2013/0268850 A1* | 10/2013 | Kyprianou | G06F 17/24 |
| | | | 715/255 |
| 2014/0075371 A1* | 3/2014 | Carmi | G06F 11/3438 |
| | | | 715/781 |
| 2014/0344657 A1 | 11/2014 | Feltham et al. | |
| 2015/0295808 A1 | 10/2015 | O'Malley et al. | |
| 2015/0331553 A1 | 11/2015 | Shaffer | |

* cited by examiner

SYNCHRONISING SCREENSHOTS IN DOCUMENTATION WITH PRODUCT FUNCTIONALITY

RELATED APPLICATIONS

This application claims the priority benefit of United Kingdom Patent Application No. 1223026.4 filed 20 Dec. 2012.

BACKGROUND

Embodiments of the inventive subject matter generally relate to the field of computer systems, and, more particularly, to computerized systems for synchronizing screenshots in documentation with product functionality.

The end user documentation of a product often contains screenshots that give users visual feedback on how to carry out a described process.

For documentation to be created with screenshots, the author of the documentation must typically understand the fundamental workings of the product, for example, how to install, set-up, etc. in order to generate the screenshots before inserting them into the documentation. This may be a problem if the author does not fully understand the workings of the product.

Another problem is that this documentation and the screenshots can easily get out of date. This could be due to functional changes in the way that the product works, or just a reorganization of the user interface. Either way it can provide confusion to the end user and may lead to a bad impression of the product.

Updating the screenshots in documentation is a slow and laborious process, which involves tracing the described path through the code and typically entering sample data. For complex scenarios, there may be a non-trivial amount of preparation that must be done in order to set up a suitable environment to demonstrate the capability being documented.

These problems are exacerbated by the requirement of producing documentation, and therefore screenshots, in multiple languages.

These problems have lead to some companies entirely abandoning screenshots in product documentation.

SUMMARY

Systems and computer program product synchronize screenshots in documentation with product functionality. Documentation source relating to a product includes placeholders where screenshots of user interface views of the product are to be located. A placeholder includes a description or pointer to a description of how to generate the user interface view of the product associated with the screenshot. A new version of the documentation may be generated. The documentation source including placeholders is read. Placeholders in the documentation are used to generate a user interface view. The user interface view is captured as a screenshot. The screenshot is inserted in the new version of the documentation at the location of the placeholder used to generate the screenshot.

BRIEF DESCRIPTION OF THE DRAWINGS

The embodiments may be better understood, and numerous objects, features, and advantages made apparent to those skilled in the art by referencing the accompanying drawings.

DESCRIPTION OF EMBODIMENT(S)

Figure 1:
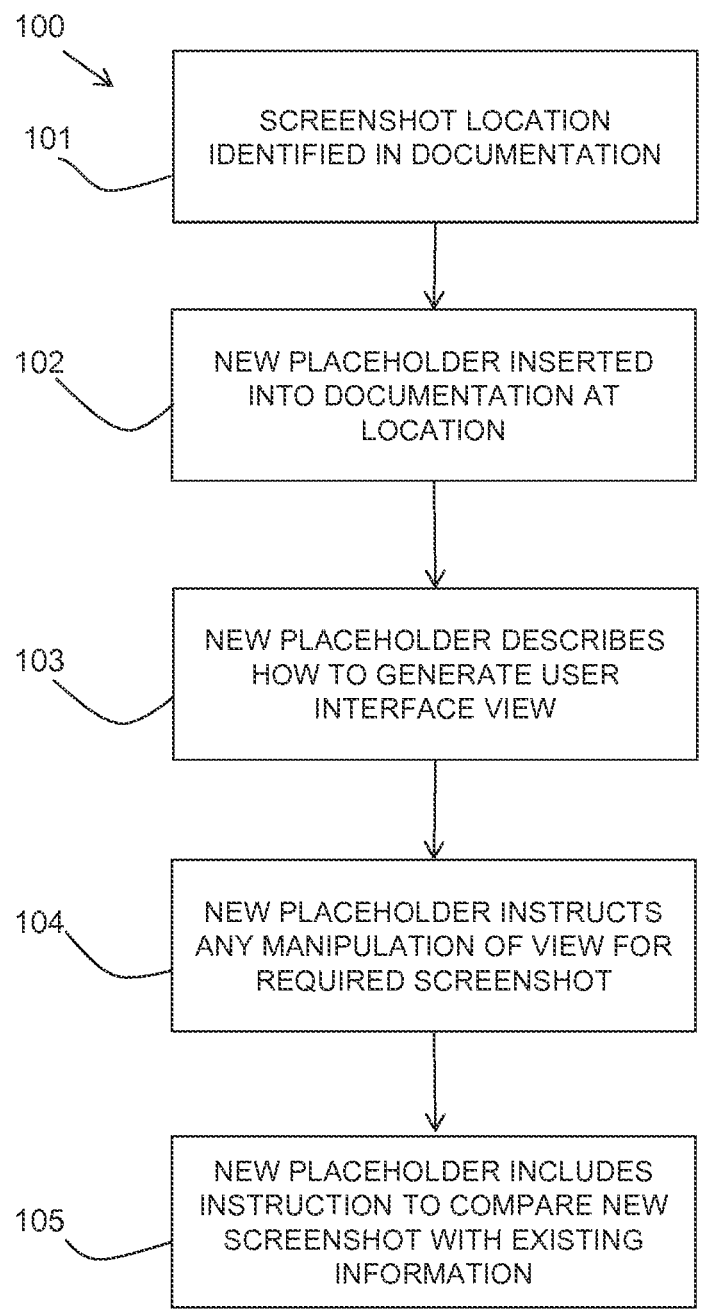
FIG. 1 is a flow diagram of an example embodiment of an aspect of a method in accordance with the inventive subject matter.

The description that follows includes example systems, methods, techniques, instruction sequences and computer program products that embody techniques of the inventive subject matter. In the following detailed description, numerous specific details are set forth in order to provide a thorough understanding of the embodiments. However, it will be understood by those skilled in the art that the embodiments may be practiced without these specific details. In other instances, well-known methods, procedures, and components have not been described in detail so as not to obfuscate the description.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

The described embodiments include an automated tool which can produce and embed up-to-date screenshots in product documentation. Placeholders giving details of how to generate a screenshot are inserted into the documentation where the screenshots should be placed, and then a tool may be run to fill in these placeholders or the screenshots may be generated manually.

The screenshot placeholder may contain enough information to tell the tool how to run the program in order to produce the screen that is required. The placeholder may provide a set of manual instructions for the tool to issue to a user should there be edge cases where it is not possible to automatically generate the screenshot.

The placeholder may also contain manipulation instructions such as a specification of which area of the screen should be included in the generated image, to avoid the manual manipulation or cropping of screenshots that currently takes place.

In general, it is difficult to make a link between source code changes and changes required in documentation. This is because there are often a number of levels of abstraction between the inner workings of a product and the user-facing aspects which are documented. Because in some embodiments, the proposed tool is linking the user interface with the documentation, it does not need to consider this abstraction.

In the described embodiments, the documentation source is annotated with screenshot placeholders, which describe how to generate the screenshot that should be inserted at that point.

An additional benefit of some embodiments may be to provide information and warnings about when the product and documentation may have got out of synchronization. A warning may be provided if the method detects that something has changed in the product:

"Warning: The functionality of the product may have changed since this documentation was written."

An error may be provided in some embodiments if a screenshot cannot be produced due to larger changes in the product:

"Error: Could not generate screenshot, placeholder needs to be updated."

An error or warning may also be raised to indicate that the documentation may be out of date.

Referring to FIG. 1, a flow diagram 100 shows an example embodiment of a method for generating placeholders for screenshots in documentation relating to a product.

A screenshot location may be identified 101 in documentation. A new placeholder may be inserted 102 into the documentation for a desired screenshot. The method of inserting a placeholder into the documentation may include, but is not limited to, one or more of the following:

- a custom Extensible Markup Language (XML) tag in XML documentation;
- a binary representation of the placeholder which could be inserted by clicking a toolbar button;
- a specific sequence of text that can be matched and replaced:
- a scripted instruction using an interpreted language, for example, a script may be include in languages such as JavaScript, Python, PHP, Perl, etc.

A new placeholder may describe 103 how to generate a user interface view in the product from which the required screenshot is taken.

In one embodiment, the placeholder may include sufficient information to tell a tool how to run the product to generate the view of which a screenshot is required. For example, this may be code to render a page in a browser component, or a reference to a section of an application.

In another embodiment, the placeholder may include a reference to access the full information which is stored elsewhere relating to how to generate the required screenshot. For example, the reference may be a URL (Uniform Resource Locator), file name, database link, etc.

The information on how to generate the desired view may include instructions of the language used to generate the user interface view if the product is available in different languages.

In many cases, products use the 'locale' that the system is currently running in to determine the language the product should run under. This can result in two scenarios:

1) Typically a French screenshot, for example, would be generated at the same time as the French documentation. It is highly likely that in order to do this the system will set the locale to be a French locale before creating the documentation. In doing so the system is already in the necessary language when the documentation and therefore the images are created. In this case, the language would be set at the start of the process, but assumes that all of the documentation and images are in the same language.

2) In cases where different languages need to be used, the language may be specified as part of the instructions on how to generate the desired view.

As an example, in the case of installers, products may provide an optional drop down list in a user interface which allows the user to select the language they wish to use. Other applications may use a similar method of selecting a language.

In the case where the product provides a selection of languages to choose from at the start, this language selection may be included in the set of steps or instructions needed to setup the product before taking the screenshot. In cases where different languages of the same screenshot are needed, similar placeholders would be added to the documentation where they only differ by the language selection. For example, selecting the second element in the list rather than the first.

The new placeholder may instruct 104 any manipulation of the required view to be shown, for example, including filling out the user interface view, cropping an area, width and height, zooming in/out, etc. A method of instructing the manipulation of the view for which the screenshot should be taken may include, but is not limited to, one or more of the following:

- specifying offsets rather than a particular element in an HTML (HyperText Markup Language) document;
- specifying a particular element in the DOM (Document Object Model) such as a particular block-level element (e.g., a "div" object) to capture (and all of its children);
- specifying a specific widget that should be captured in a Java SWT (Standard Widget Toolkit) (Java is a trade mark of Oracle America, Inc.) application;
- specifying a more complex sequence of steps that should be executed in order to generate the screenshot;
- filling out steps of a wizard, or entries in a user interface.

The new placeholder may optionally include an instruction 105 to compare a new screenshot to existing information, such as a previous screenshot (for example, as generated by using an older version of the user interface) or to compare to the product documentation, to provide a warning of a lack of synchronization between the documentation and the product.

Figure 2:
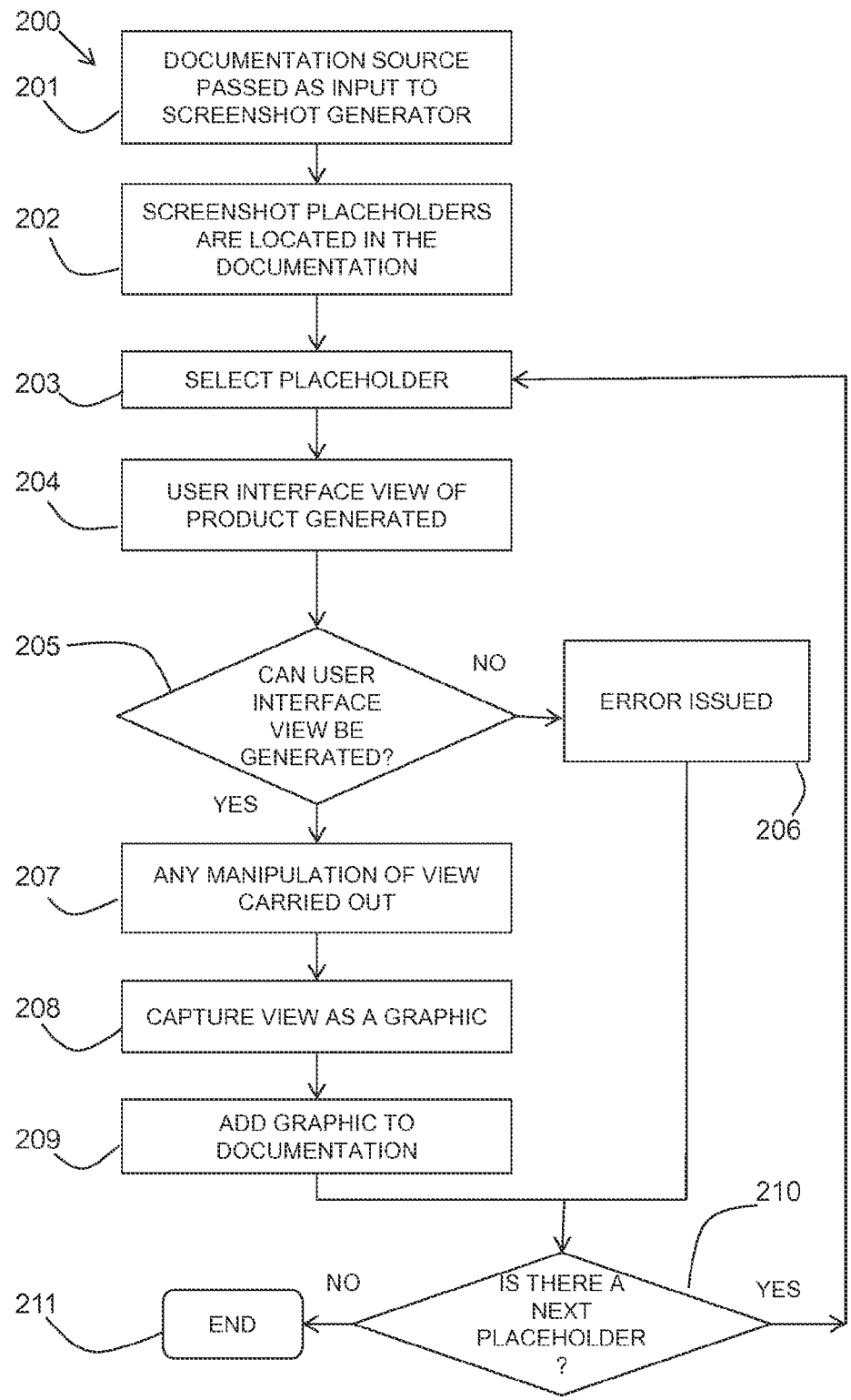
FIG. 2 is a flow diagram of an example embodiment of an aspect of a method in accordance with the inventive subject matter.

Referring to FIG. 2, a flow diagram 200 shows an example embodiment of a method for generating screenshots in documentation relating to a product.

A documentation source may be passed as input 201 to a screenshot generator. Screenshot placeholders may be located 202 in the documentation.

A placeholder may be selected 203 and a user interface view of the product generated 204, for example, rendering a page in a browser component, or opening a window in an application.

It may be determined 205 if the user interface view can be generated. If it cannot be generated, for example, due to changes in the product, such as a particular element that is referenced in a placeholder no longer existing, an error may be issued 206. The user can then be alerted that the documentation no longer matches the product. This may be a useful indication that the documentation associated with the screenshot needs updating.

The method may then proceed to determine 210 if there is a next placeholder in the documentation. If so, the method may loop to step 203 of selecting a next placeholder. If there is no further placeholder, the method may end 211.

If it is determined 205 that the user interface view can be generated, the method proceeds and any manipulation of the user interface view may be carried out 207 according to any instruction in the placeholder. The view may be captured 208 as a vector or raster graphic to provide the screenshot.

The graphic providing the screenshot may be added 209 to the documentation. In one embodiment, the placeholders are maintained in a source documentation and are removed when a final version of the documentation is generated for a user. In another embodiment, placeholders may remain in the documentation presented to a user in a hidden form.

The source documentation may include just the placeholders. Alternatively, the source documentation may include the placeholders and the last generated screenshot in order to enable any newly generated screenshot to be compared to a previously generated screenshot.

It may then be determined 210 if there is a next placeholder in the documentation. If so, the method may loop to step 203 of selecting a next placeholder. If there is no further placeholder, the method may end 211.

Figure 3:
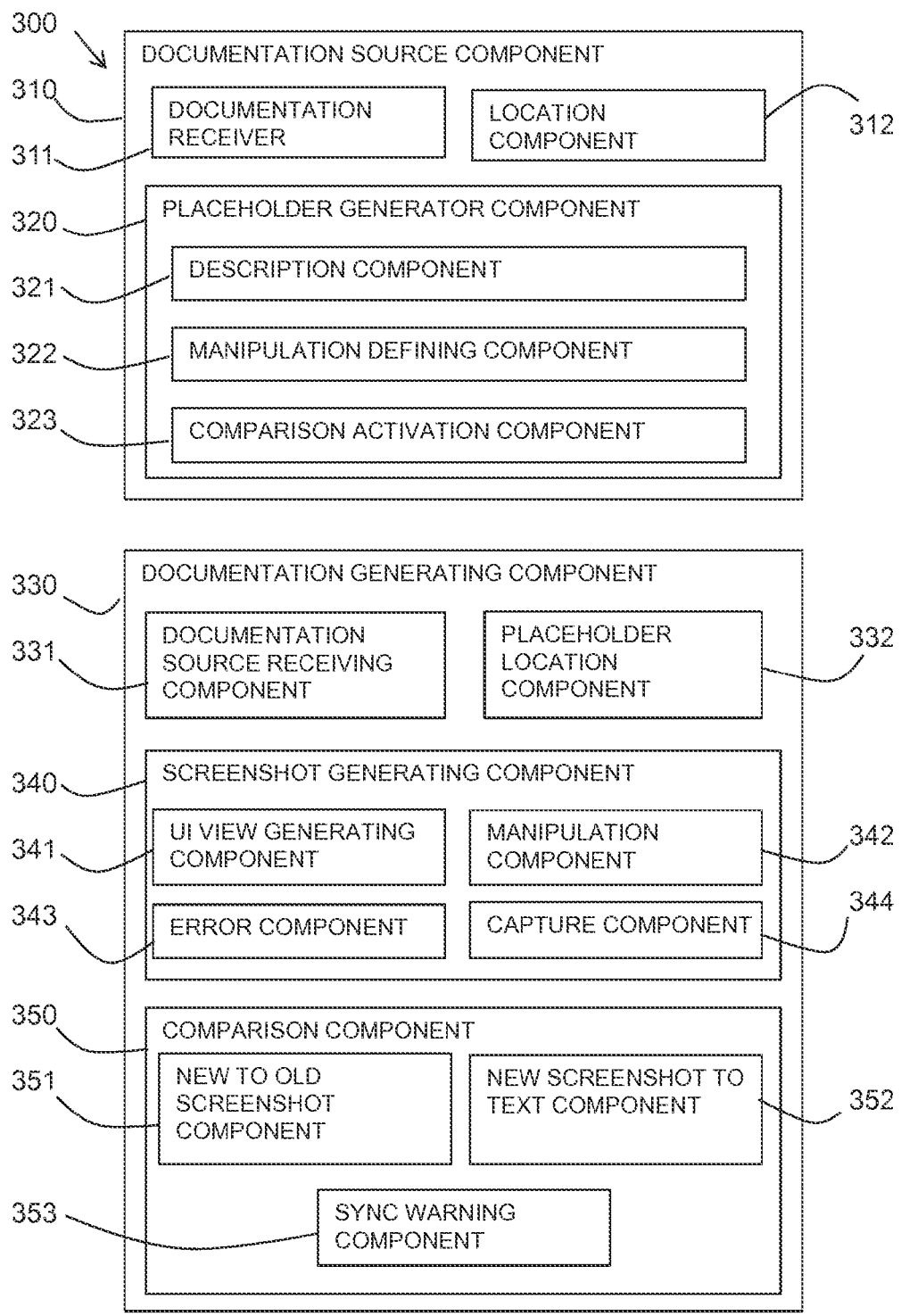
FIG. 3 is block diagram of an example embodiment of a system in accordance with the inventive subject matter.

Referring to FIG. 3, a block diagram shows an example embodiment of the described system 300.

A documentation source component 310 may be provided for generating a documentation source with placeholders for screenshots relating to aspects of a product.

The documentation source component 310 may include a documentation receiver 311 for receiving documentation for which a documentation source including placeholders for updateable screenshots is required. The documentation source component 310 may also include a location component 312 for locating places in the documentation where screenshots are required.

The documentation source component 310 may include a placeholder generator component 320 for generating placeholders in the documentation. The placeholder generator component 320 may include a description component 321 for describing how to generate a user interface view in the product from which the required screenshot is taken. The placeholder generator component 320 may also include a manipulation defining component 322 for defining any manipulation or selection of an area of the view for the screenshot.

The placeholder generator component 321 may also include a comparison activation component 323 for activating a comparison of a new screenshot with a previous screenshot or with the relevant text at the time of screenshot generation.

A documentation generating component 330 may be provided for generating documentation including up-to-date screenshots for a product. The documentation generating component 330 may include a documentation source receiving component 331 for receiving a documentation source as generated by the documentation source component 310 including placeholders in the documentation. A placeholder location component 332 may be provided to locate the placeholders in the received documentation source.

The documentation generating component 330 may include a screenshot generating component 340 for generating a screenshot at each placeholder in the documentation source. The screenshot generating component 340 may include a user interface view generating component 341 for using the description in the placeholder to generate the required user interface view in the product for the required screenshot. The screenshot generating component 340 may also include a manipulation component 342 for applying any manipulation defined in the placeholder to the view to obtain the required screenshot.

The screenshot generating component 340 may also include a capture component 344 for capturing the required screenshot image.

The screenshot generating component 340 may also include an error component 343 which may issue a warning, error or alert if the user interface generating component 341 fails to generate the required user interface view which indicates that there is a problem or incompatibility between the product and the placeholder.

The document generating component 330 may also include a comparison component 350 for comparing the generated screenshot to given information. The comparison component 350 may include a new to old screenshot component 351 for comparing a newly generated screenshot to a previous screenshot and a new screenshot to text component 352 for comparing a new screenshot to the relevant documentation text. A synchronization warning component 353 may provide a warning if the old and new screenshots differ or if the new screenshot differs from the text.

The documentation generating component 330 may maintain a source documentation version with the placeholders and optionally the most recently generated screenshots. The documentation generating component 330 may also include a user version of the documentation which only includes the screenshots.

Figure 4:
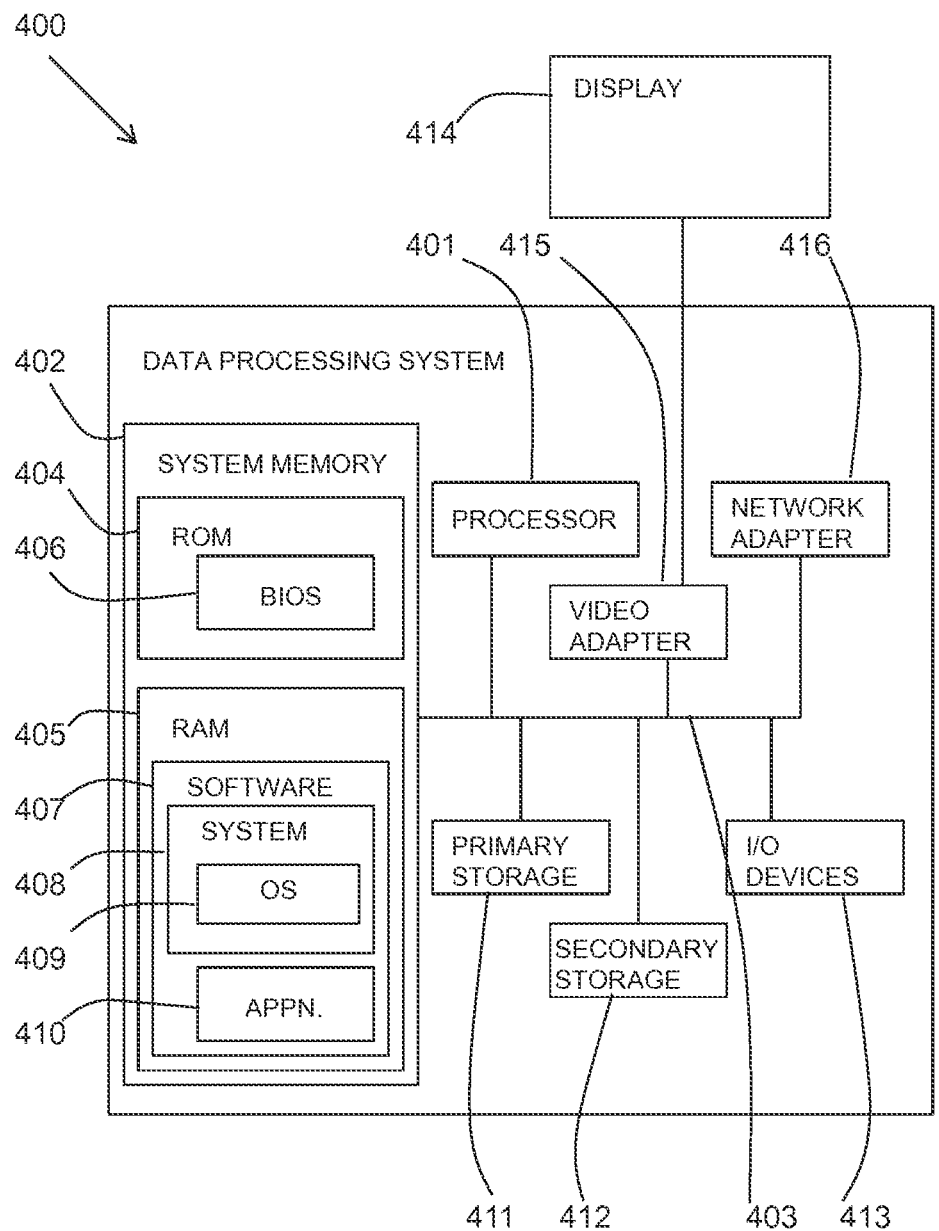
FIG. 4 is a block diagram of example computer system in which embodiments may be implemented.

Referring to FIG. 4, an example system for implementing aspects of the embodiments includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

An example for HTML (HyperText Markup Language) documentation follows below.

Example: Documenting a Web Application Using HTML

In this example, documentation is written as HTML. The product interface being described is a web application, also written using HTML. A sample extract from the source of the documentation follows:

```
<p>The user should then press on the list users button.</p>
<screenshot id="listUsers"
xmlns:xlink="users.html#xpointer(//div[@class='userManagement'])" />
```

Taking the same sample extract, the following shows the language attribute which could be added to signify what language these should be created in.

```
<p>The user should then press on the list users button.</p>
<screenshot id="listUsers" lang="fr_FR"
xmlns:xlink="users.html#xpointer(//div[@class='userManagement'])" />
```

This consists of a paragraph of text followed by a screenshot placeholder. The placeholder makes use of a linking component (for example, the XLink (XML Linking Language) or XPointer W3C recommendations) to reference a particular section of the web application being documented. When the documentation source is passed as input to the screenshot generator, the following occurs in some embodiments:
1. Locate all <screenshot> placeholders in the documentation.
2. For each placeholder:
   1. Render the linked page in a browser component;
   2. Identify the boundary of the element specified by an XPointer (or the bounding box);
   3. Capture this area as a vector or raster graphic;
   4. Replace the placeholder with the image.

The output of this process might be the following, where listUsers.png is the graphic generated in step 2.3 above:

```
<p>The user should then press on the list users button.</p>
<img id="listUsers" src="listUsers.png" />
```

Further attributes may be included in the placeholder for manipulation of the image that gets embedded, e.g. width, height.

The example described is just one possible implementation of the various embodiments, which works with HTML documentation documenting an HTML web application.

An example implementation of the sequence of steps described above may be the scripting supported by a tool for automated testing of software applications, for example, IBM Rational Functional Tester (RFT) (IBM is a trade mark of International Business Machines Corporation). By either linking to or embedding a test script in the documentation, screenshots which require complex preconditions (for example, filling out several steps of a wizard) may be generated. For example, a storyboard testing feature may be extended to support the creation of screenshot placeholders based on the functional tests that have been written for the product.

For more sensitive detection of product changes, the capabilities of the screenshot generation tool may be extended to look at differences between the screenshot generated from the current version of the product and the screenshot generated from the previous version of the product. For example, a screenshot may display a sequence of boxes that a user should fill in. In a new version of the product, the order of the boxes may have changed. If the accompanying text is describing the boxes in sequence, it would need to be changed. The documentation owner may be alerted to this by comparing the two screenshots and producing a warning if these differ. This may be done with a simple pixel-based technique or with a more complex computer vision methods, such as the scale-invariant feature transform algorithm.

Figure 5:
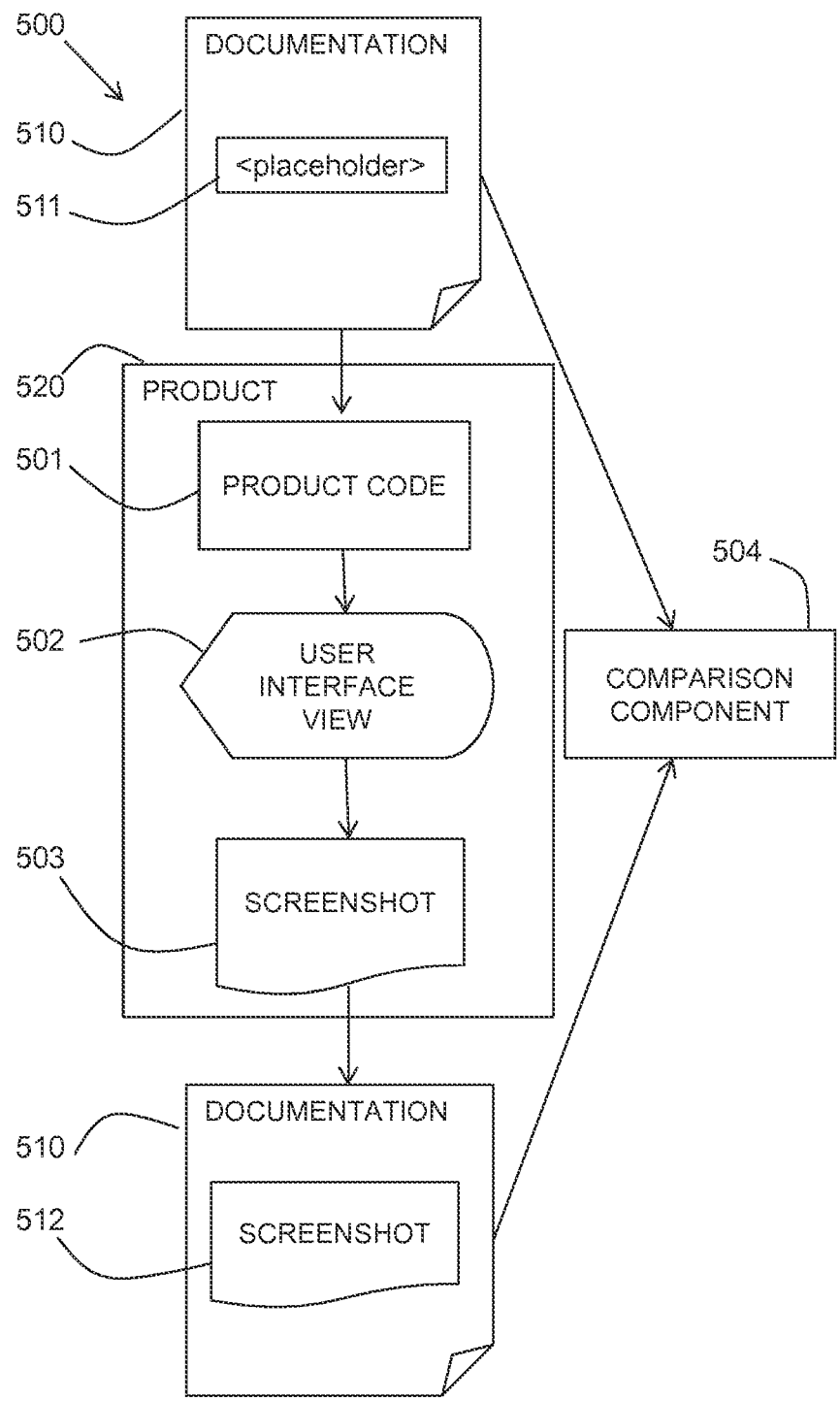
FIG. 5 is a schematic diagram showing a flow of an embodiment of a method in accordance with the inventive subject matter.

Referring to FIG. 5, a schematic diagram 500 shows the an example of the above-described method. Documentation 510 relating to a product 520 includes placeholders 511 providing details of screenshots of aspects of the product 520 required in the documentation 510. A placeholder 511 may activate product code 501 of the product 520 to generate a user interface view 502 which may be captured in a screenshot 503. The screenshot 503 may then be added in place of or in addition to the placeholder 511 in the documentation 510. A comparison component 504 may compare generated screenshots 512 to the documentation text or earlier screenshots to provide a warning that changes may have resulted in a lack of synchronization between the product 520 and the documentation 510.

The described embodiments may be used by software houses producing the documentation. A screenshot generating tool may be used by a documentation writer or the software developers to produce a "normal" static copy of the documentation to be provided to the user in a format the user might expect e.g. a PDF (Portable Document Format) document. Some embodiments remove the need for the user to have skills in and knowledge of how to use a proprietary documentation tool and provide them with an up-to-date version of the documentation in a format they will already be familiar with.

A screenshot placeholder that contains information about how to produce the screenshot is inserted into documentation. It specifies which component(s) of the screen should be included in that screenshot. Warnings may be produced if a screenshot is re-created which may indicate the surrounding documentation requires an update. Errors can also be produced for the surrounding documentation if a screenshot is no longer possible.

The ability to provide errors and warnings to the development team means that the production of documentation can directly feed into the development process and be used as an additional form of testing, debugging and error checking.

Using an automated tool can produce and embed up-to-date screenshots in the product documentation. Placeholders may be inserted into the documentation where the screenshots should be placed, and then a tool may be run to fill in these placeholders.

Due to the fact that the screenshots, and the production of these screenshots, are described using a set of potentially machine readable instructions, the screenshots can be generated without any understanding of the product itself. As these instructions are committed into the documentation source control, developers can ensure that they are kept up to date.

As will be appreciated by one skilled in the art, aspects of the inventive subject matter may be embodied as a system, method or computer program product. Accordingly, aspects of the inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques synchronizing screenshots in product documentation with product functionality as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
   a processor; and
   a computer readable storage medium having computer usable program code embodied therewith, the computer usable program code executable by the processor to cause the apparatus to:
   receive documentation associated with a product, the documentation including placeholders where screenshots of user interface views of the product are to be located, wherein a placeholder includes one of a description or a pointer to a description, the description including a set of instructions that, when executed, run the product and execute a script for an automated test tool, the script including a sequence of steps to cause the product to select, via a user interface of the product, a language to use to generate a user interface view;
   generate, by one or more processors, the user interface view in accordance with the description;
   capture the user interface view as a screenshot;
   insert the screenshot into a new version of the documentation at a location determined by the placeholder.

2. The apparatus of claim 1, wherein the placeholder includes one of instructions or a pointer to instructions, the instructions describing a manipulation of the user interface view for the screenshot.

3. The apparatus of claim 2, wherein the instructions include one or more of: specifying offsets for elements in the user interface view, specifying a particular element in a document object model to capture, specifying a widget to be captured, or specifying any cropping or zooming of the screenshot.

4. The apparatus of claim 2, wherein the computer usable program code further includes computer usable program code configured to:
  compare the screenshot with documentation text; and
  in response to detection of differences between the screenshot and the documentation text, issue a synchronization warning.

5. The apparatus of claim 2, wherein the placeholder comprises at least one of a tag, a sequence of text, a binary representation, or a scripted instruction.

6. The apparatus of claim 1, wherein the documentation includes at least one previous screenshot, wherein the placeholder includes an instruction to compare the at least one previous screenshot with the screenshot, and wherein the computer usable program code includes computer usable program code to cause the apparatus to:
  compare the at least one previous screenshot in the documentation with the screenshot; and
  in response to a determination that the at least one previous screenshot is not the same as the screenshot, issue an alert.

7. The apparatus of claim 1, wherein the sequence of steps in the script further include steps that, when executed, cause the product to navigate a user interface of the product.

8. The apparatus of claim 1, wherein the sequence of steps in the script further include steps that, when executed, cause the product to perform either or both fill out steps of a wizard or fill out entries in a user interface.

9. The apparatus of claim 1, wherein the product comprises an application, and wherein the computer usable program code to generate the user interface view in accordance with the description includes computer usable program code to open a window in the application.

10. A computer program product for synchronizing screenshots in documentation with product functionality, the computer program product comprising a computer readable storage medium having computer usable program code embodied therewith, the computer usable program code comprising a computer usable program code to:
  receive documentation associated with a product, the documentation including placeholders where screenshots of user interface views of the product are to be located, wherein a placeholder includes one of a description or a pointer to a description, the description including a set of instructions that, when executed, run the product and execute a script for an automated test tool, the script including a sequence of steps to cause the product to select, via a user interface of the product, a language to use to generate a user interface view;
  generate, by one or more processors, the user interface view in accordance with the description;
  capture the user interface view as a screenshot;
  insert the screenshot into a new version of the documentation at a location determined by the placeholder.

11. The computer program product of claim 10, wherein the placeholder includes one of instructions or a pointer to instructions, the instructions describing a manipulation of the user interface view for the screenshot.

12. The computer program product of claim 11, wherein the instructions include one or more of: specifying offsets for elements in the user interface view, specifying a particular element in a document object model to capture, specifying a widget to be captured, or specifying any cropping or zooming of the screenshot.

13. The computer program product of claim 10, wherein the computer usable program code further includes computer usable code configured to:
  compare the screenshot with documentation text; and
  in response to detection of differences between the screenshot and the documentation text, issue a synchronization warning.

14. The computer program product of claim 10, wherein the description includes one or more of: code to render a page, code to generate a window of an application, or the language to be used in the generation of the user interface view.

15. The computer program product of claim 10, wherein the screenshot is added to the documentation in addition to the placeholder.

16. The computer program product of claim 10, wherein the documentation includes at least one previous screenshot, wherein the placeholder includes an instruction to compare the at least one previous screenshot with the screenshot, and wherein the computer usable program code further comprises computer usable program code to:
  compare the at least one previous screenshot in the documentation with the screenshot; and
  in response to a determination that the at least one previous screenshot is not the same as the screenshot, issue an alert.

17. The computer program product of claim 10, wherein the sequence of steps in the script further include steps that, when executed, cause the product to navigate a user interface of the product.

18. The computer program product of claim 10, wherein the sequence of steps in the script further include steps that, when executed, cause the product to perform either or both fill out steps of a wizard or fill out entries in a user interface.

19. The computer program product of claim 10, wherein the product comprises an application, and wherein the computer usable program code to generate the user interface view in accordance with the description includes computer usable program code to open a window in the application.

* * * * *